June 6, 1933. H. W. ALDEN 1,913,098
ENDLESS TRACK FOR TRACTORS
Filed Oct. 7, 1931 2 Sheets-Sheet 1
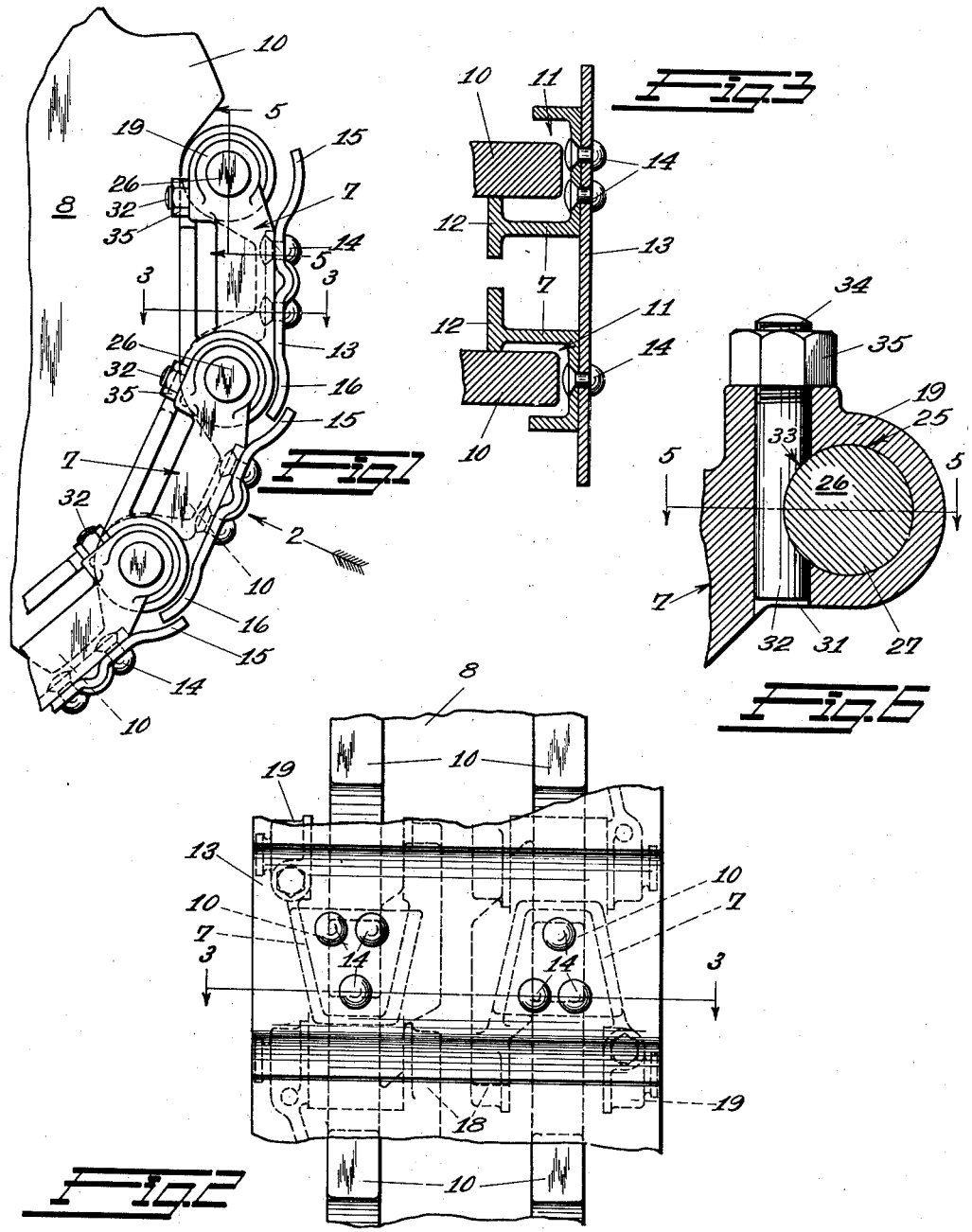
Inventor
Herbert W. Alden
By Stauch & Hoffman
Attorneys

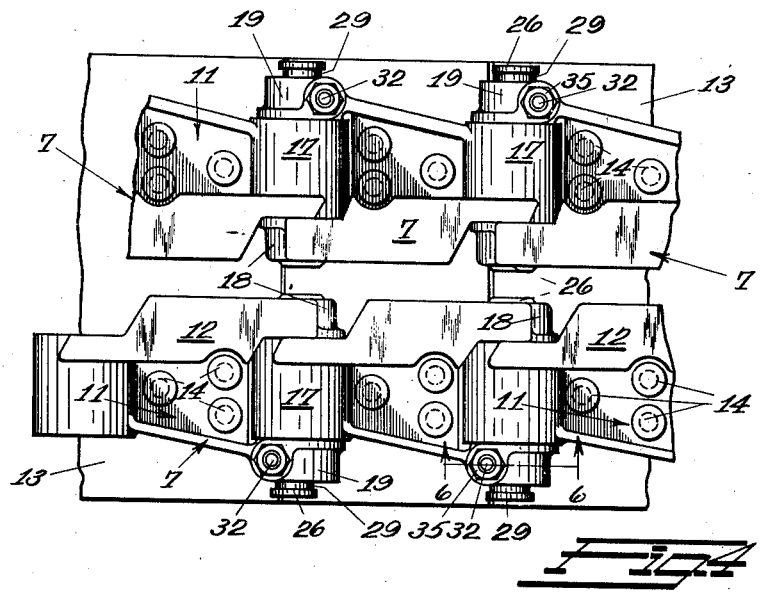
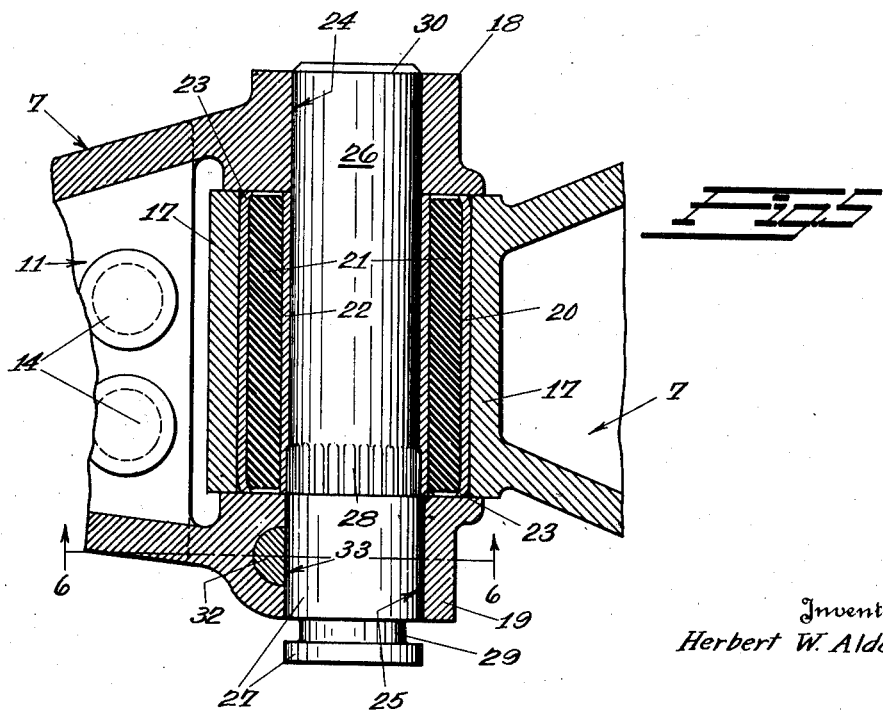
Inventor
Herbert W. Alden

Patented June 6, 1933

1,913,098

UNITED STATES PATENT OFFICE

HERBERT W. ALDEN, OF DETROIT, MICHIGAN

ENDLESS TRACK FOR TRACTORS

Application filed October 7, 1931. Serial No. 567,492.

This invention relates to endless tracks for track-laying tractors, conveyor chains and the like and has as its main object the improvement of track and chain links and their interconnections.

It is common knowledge that the life of any type of endless track or conveyor chain is determined by the maximum length of life of the connections between the track links. The life of the connections in turn is dependent on the conditions under which the tractor or chain is operated and upon the types of joints which form the connections.

Present commercial forms of tractor tracks and conveyor chains embody links each pair of which is joined by one or more detachable pivotal connections wherein there is frictional sliding or oscillating movement between two metallic surfaces that can not be kept effectively lubricated. Since tractor tracks must work in earth, sand, water and impalpable dust, all of the relatively movable engaged surfaces are abraded and worn down at a very rapid rate. This accelerated destruction of the connections not only renders their life undesirably and expensively short, but also, during the process of erosion, decreases the driving efficiency of the tractor and develops noisy play in the joints.

It is the primary object of my invention to eliminate the undesirable defects and disadvantages above referred to by devising link or shoe connections for tractor tracks, conveyor chains and the like having no pivotal bearing surfaces which partake of relative sliding movement. This objective is accomplished by utilizing rubber or like material in the joints in such a way that the necessary pivotal movements are permitted solely by internal deformation. The rubber preferably is assembled under tension and is placed under shear load as the track links assume angular relationships while passing around the driving sprockets.

Tracks and chains embodying the present invention not only have no relatively slipping surfaces which cause rapid wear, but also are substantially noiseless in that there is no clattering at the joints, and that the rubber permits lengthwise resisted yieldability of the track to cause the links thereof to readily engage and leave the sprocket lugs and yet to fit upon the latter snugly and firmly.

This is not the first proposal to utilize rubber in the tracks of track-laying tractors, but the present invention is believed to be the first to eliminate all relatively sliding and oscillating surfaces from the link joints, and to result in the production of highly improved, long life silent tractor and like chains in which the necessity for lubrication is eliminated, and the efficiency is materially improved.

In all prior suggestions for utilizing rubber inserts in tractor chains, the rubber has been included merely to cushion the track and has been placed solely under compression. The prior proposed constructions have included either a compound single pivot between each pair of links with the rubber metallic bodies of the pivots slidable relative to other parts engaged thereby; or a rubber joint between each pair of links, and in addition thereto one or more separate metallic bearing pivots. In such constructions the rubber is not placed under torsional or shear load as it passes the sprockets, and the interconnections wear substantially as rapidly as in the older all-metal forms. The present invention in eliminating all slipping pivotal surfaces is a radical departure from the proposed prior driving chain and endless constructions and a marked advance in the art.

Further objects of the present invention are to devise special chain and track links for cooperation with my improved types of connections; and to improve endless track and like chain constructions as a whole.

It is another object of this invention to design and arrange improved link connections in such manner that they may be readily assembled and replaced. In the preferred form of tractor track hereinafter disclosed two parallel series of identical links are mounted with their like edges facing each other and with connecting pins adapted to be withdrawn outwardly from both series.

It is also an object of the present invention to provide novel means for locking the connections in their assembled positions.

Further objects will appear in the following detailed description with its appended claims and accompanying drawings.

In the drawings:

Figure 1 is a side elevational view of a portion of the preferred form of the track, of the present invention, passing over a sprocket.

Figure 2 represents an outer face view of the structure of Figure 1, seen when looking in the general direction of the arrow 2.

Figure 3 is a sectional view taken substantially on the plane of line 3—3 in Figure 1.

Figure 4 is an inner face view of a portion of the track of Figures 1–3, showing the sprocket engaging side of the track.

Figure 5 is an enlarged partial sectional view, taken on the planes of the lines 5—5 in Figs. 1 and 6, and showing the details of a link connection.

Fig. 6 represents another detailed section through the link connection, as seen when looking on the planes of lines 6—6 in Figs. 4 and 5.

With continued reference to the drawings, wherein like numerals are employed to designate like parts, the illustrated form of track comprises two parallel series of interconnected links 7 with the links of one series reversed end for end with respect to those of the other series, and with all the links designed to be driven by a tractor sprocket 8 which has two parallel rows of driving lugs 10.

The body of each link 7, preferably consisting of malleable iron, is of special shape to provide a three-sided recess or pocket 11 with which the sprocket lugs 10 may coact to drive the track. Each link body has a flanged portion 12 (see Fig. 3) designed to engage the inner sides of the lugs for maintaining a proper longitudinal alignment of the track upon the sprocket.

Each laterally opposed pair of links is laterally spaced by a tread element or shoe 13 in the form of a substantially flat steel stamping which is secured to said pair of links, as by rivets 14. The ends of each shoe are bent (see Fig. 1) into curved portions 15 and 16 respectively of different radii so that, when the links are passing over the sprocket and the contigous shoes assume angular relationships, the end portion 15 of one shoe may swing relative to the overlapt end portion 16 of another, without binding. The overlapt arrangement is utilized to exclude sand and dirt from links when the shoes are pressed into the earth.

As previously stated, the track links 7 are designed for pivotal interconnection. Each link has one end terminating in a horizontal cylindrical sleeve 17 integrally formed on the link body, and its other end provided with a pair of integral forked extensions 18, 19, designed to receive the sleeve 17 of an adjacent link. Each sleeve 17 has inserted therein a bearingless assembly comprising a pair of concentric shells 20 and 22 between which is gripped a rubber body in the form of a bushing 21. The outer shell 20 has a pressed fit within the sleeve 17 and hence is non-rotatable relative thereto. The ends of the shell 20 are reduced slightly in diameter, as indicated at 23, to compress the ends of the rubber bushing. The latter is in tension between the shells so that neither shell can be oscillated relative to the other without placing the rubber under shear load—i. e., there can be no slipping of the shell and rubber surfaces relative to one another. The rubber bushing is shorter than the shells so as to provide end spaces into which the rubber may flow when it is placed under compression during driving operation, and in this manner the track has a cushioning effect and a restricted longitudinal yieldability.

The forked extensions 18 and 19 are provided with transverse bores 24 and 25 respectively, of which the bore 24 is of substantially the size of the inner diameter of shell 22 and adapted for alignment therewith to receive a connecting pin 26, and of which the bore 25 is of a size to receive an enlarged portion 27 of the pin 26. The pin 26 also has a slightly enlarged fluted portion 28, which as the pin is driven into position, bites into the inner shell 22 to fix the latter against rotation relative to the pin. Although the shell and bushing assembly preferably is formed as a unit with the rubber under tension before insertion of the assembly, the inner shell 22 may, if desired, be made radially expansible and of such size that as the pin is driven through the assembly it will expand the shell outwardly to compress the rubber. Its chamfered end 30 permits the pin to be driven with a forced fit. The enlarged head portion 27 has a peripheral groove 29 for the reception of a pulling tool (not shown) used to withdraw the pin when necessary or desired.

The pin 26 is locked against rotation within the forked extensions 18 and 19. The extension 19 has a hole 31 which intersects a portion of the bore 25 at right angles with the axis of the latter. A specially designed clamping bolt 32 projects freely into the hole 31 and has an undercut clamping surface 33 which is designed to engage a portion of the pin section 27. The outer end of the bolt is threaded, as at 34, to receive a locking nut 35, which when tightened, draws the surface 33 into such forceful engagement with the pin as to prevent both longitudinal and rotational movement of the latter relative to the member 19. The threads 34 preferably are of the Dardalet self-locking type.

From the foregoing description it will be seen that each individual section of the track comprises a shoe 13 to which is secured a pair of oppositely directed links 7, each having a shell and bushing assembly forced into its sleeve 17, a bolt 32 in its hole 31, and a pin 26 inserted through its fork 18, 19. Each section may be pivotally joined to an adjacent section by first loosening the nuts 35 and partially withdrawing the pins 26, then sliding each sleeve 20 into position between the extensions 18 and 19, then driving each pin 26 into place, and thereafter tightening each nut 35. It will further be noted that the heads of all the pins 26 face outwardly toward the lateral edges of the assembled track, whereby each may be conveniently inserted and replaced independently of the others.

It should be observed that the link interconnections, unlike those heretofore proposed in the art, embody no bearing or relatively sliding surfaces that take the driving or other great thrusts and reactances during operation and rapidly wear away as a result thereof. Although the side surfaces of the fork 18, 19 preferably are in bearing contact with the ends of the sleeve 17 for the purpose of preventing foreign matter from gaining access to the rubber bushing assembly to deteriorate the rubber, it will be observed that there can be no appreciable wear at these contacting surfaces. The pin 26 being locked within the fork 18, 19, the shell 22 being non-rotatably secured to the pin, the shell 20 being non-rotatably carried in the sleeve 20 and the rubber bushing 21 being gripped under tension between the shells, it follows that relative pivotal movement of the links is permitted solely by torsional and internal deformation of the rubber. When the links assume angular relationships while passing over the sprockets, as in Figure 1, the rubber is under shear load. The connections have a long life since there is no opportunity for sand, dust or water to have any detrimental erosional effect upon them.

The rubber connections have the further advantages of quiet track operation, and limited endwise track flexibility and automatic adjustment, which provides a cushioned drive.

Tracks and chains formed in accordance with this invention are particularly efficient and satisfactory for use on high speed tractors, such as armored tanks and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, in a pair of interconnected chain links, an integral sleeve on one end of one of said links and an integral bifurcated portion on an end of the other link, and means for interconnecting said sleeve and said portion, said means comprising a unitary bushing of deformable material fixed against rotation within said sleeve throughout substantially the entire axial length of the latter, a metallic shell fitted non-rotatably within said bushing so as to hold the latter constantly under internal stress in longitudinal tension, and a pin extending through said shell and said bifurcated portion in locked relationship to the shell and said bifurcated portion.

2. An endless track for tanks, tractors and like vehicles, said track comprising a series of rigid links each of which has a transverse sleeve at one end and an integral fork at the other, the sleeve of each track link being assembled in the fork of an adjoining link, a pin individual to and passing through each sleeve and fork assembly and held in non-rotative relation to said fork, a single elongated rubber bushing immovably mounted between each sleeve and that portion of the corresponding pin which passes through said sleeve, said rubber bushings being assembled under initial longitudinal tension so that when the track links are in a straight line the bushings will resist pivotal movement of said links and tend to reduce sagging and flopping of the aligned track during operation of the vehicle, and each track link having its central body portion designed to receive a driving lug in direct alignment with the above described resilient pivots which transmit the driving forces through its ends to the next adjacent track links.

3. In an endless track for vehicles, two parallel series of identical links, each link having a sleeve at one end and a fork at the other, the sleeve of each link being assembled in the fork of another in the same series, each of the forks of one series of links being transversely aligned with the sleeve of the directly opposite link of the other series so that the links of one series are arranged reversely to the links of the other series, pins passing through the sleeve and fork assemblies with the pins of one series in alignment with those of the other series, a substantially flat shoe secured to each pair of transversely opposed links, and guiding means on each series of links to prevent lateral displacement of the track relative to the vehicle wheels.

4. An endless track adapted to be arranged about a pair of tandem wheels at least one of which is a drive wheel, said track comprising a series of rigid links each of which has a transverse sleeve at one end and a fork at the other, the sleeve of each track link being assembled in the fork of an adjoining link, a pin individual to and passing through each sleeve and fork assembly and held in non-rotative relation to said fork, a rubber bushing mounted between each sleeve and that portion of the corresponding pin which passes through said sleeve, said rubber bushings being so assembled and under initial tension that they resist pivotal movement of the links when the latter are aligned, whereby said rubber bushings substantially prevent any sagging or flopping of the track between the tops of said wheels.

In testimony whereof I affix my signature.

HERBERT W. ALDEN.